Figure 1:
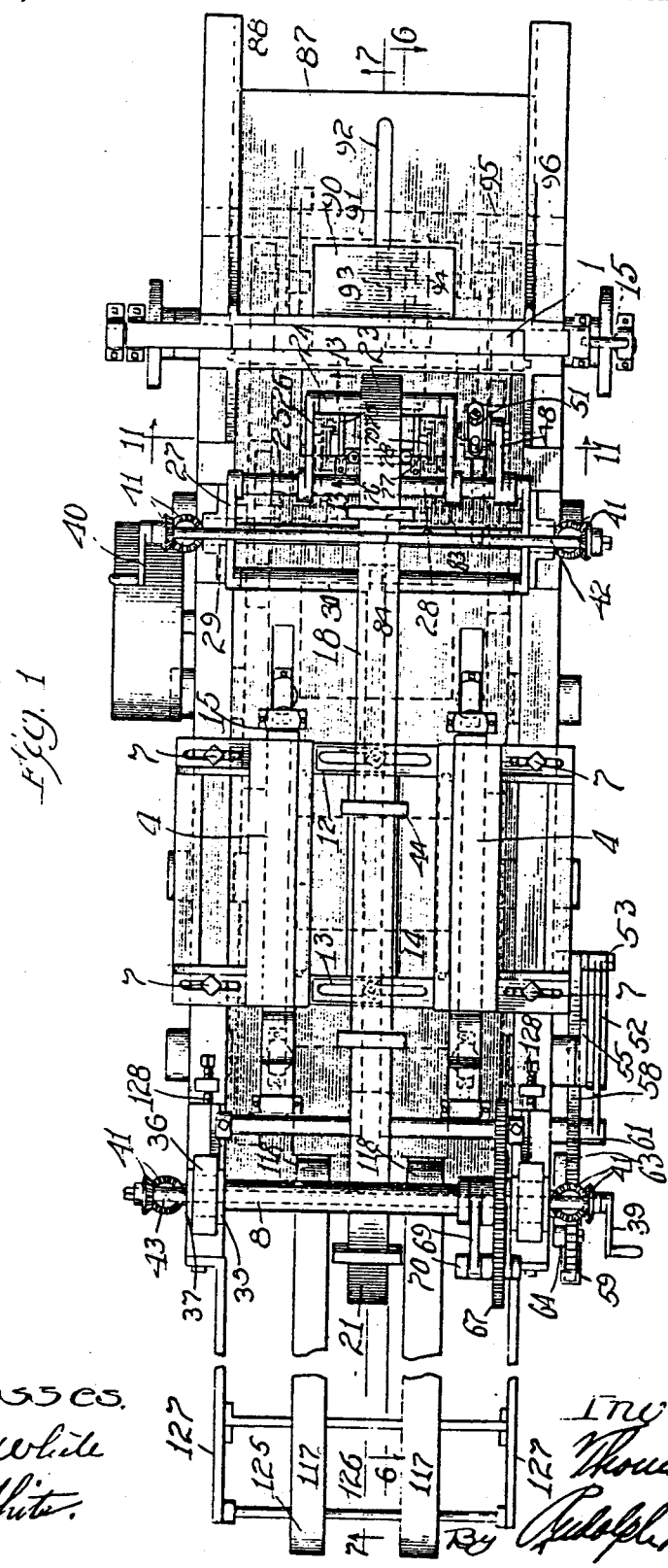

T. C. WELCH.
AUTOMATIC CONTINUOUS BOOK TRIMMING MACHINE.
APPLICATION FILED FEB. 14, 1910.

1,076,726.

Patented Oct. 28, 1913.

9 SHEETS—SHEET 1.

Witnesses
H. R. L. White
R. A. White

Inventor:
Thomas C. Welch
By Rudolph ...
Atty.

T. C. WELCH.
AUTOMATIC CONTINUOUS BOOK TRIMMING MACHINE.
APPLICATION FILED FEB. 14, 1910.

1,076,726.

Patented Oct. 28, 1913.
9 SHEETS—SHEET 4.

T. C. WELCH.
AUTOMATIC CONTINUOUS BOOK TRIMMING MACHINE.
APPLICATION FILED FEB. 14, 1910.
1,076,726.
Patented Oct. 28, 1913.
9 SHEETS—SHEET 5.
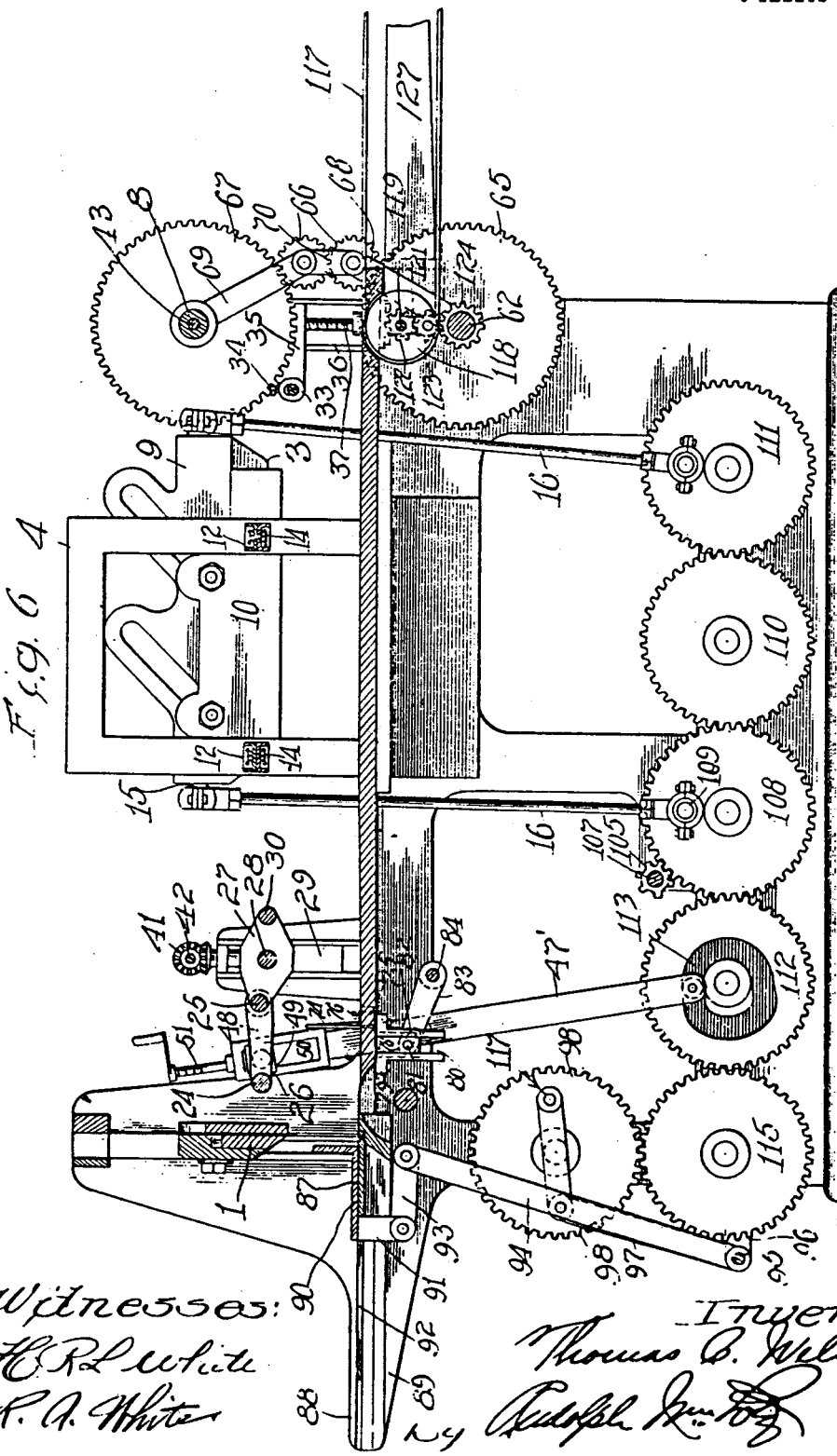
Witnesses:
H. R. L. White
R. A. White
Inventor
Thomas C. Welch
by Rudolph M. Foy
Atty

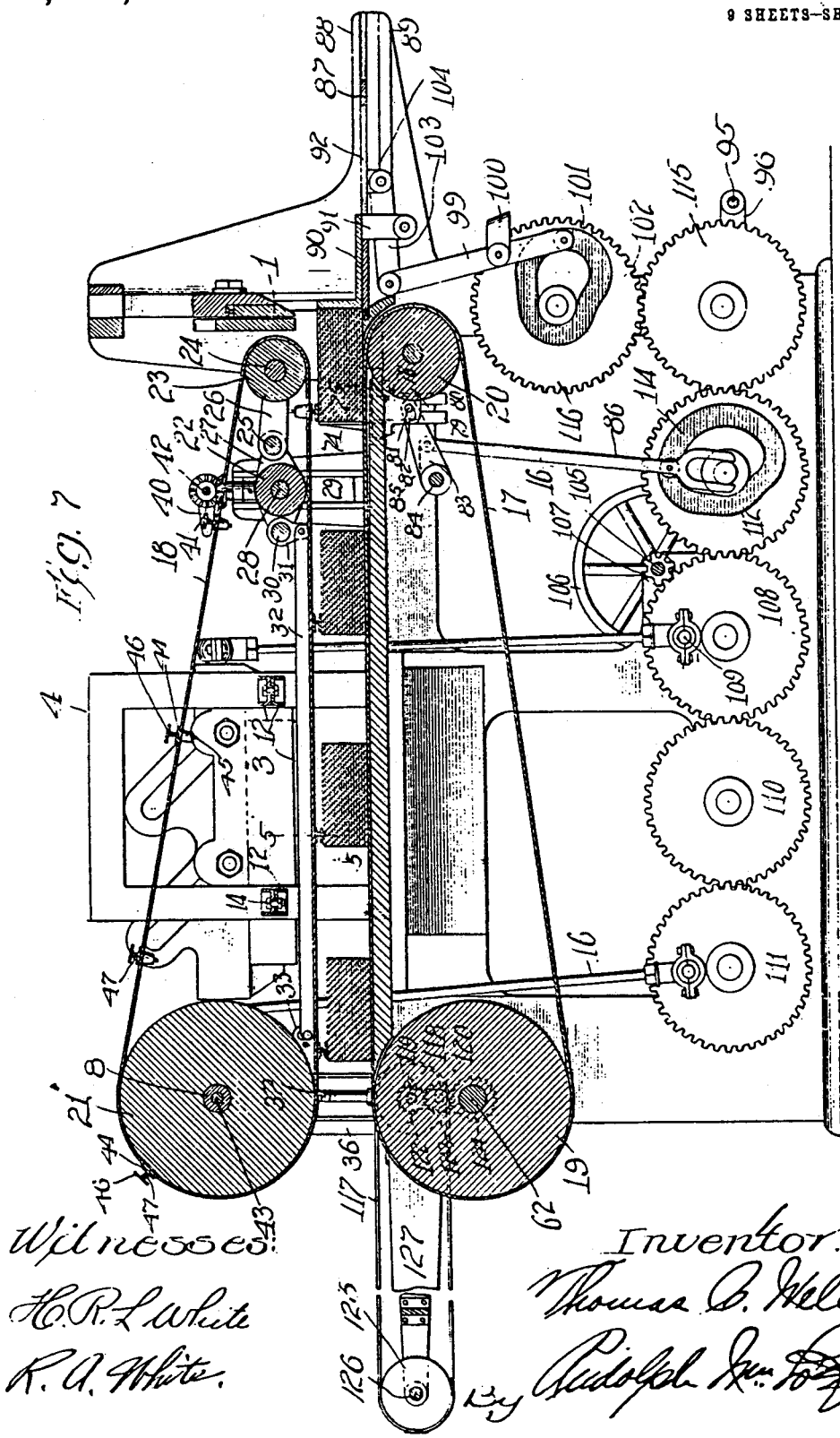

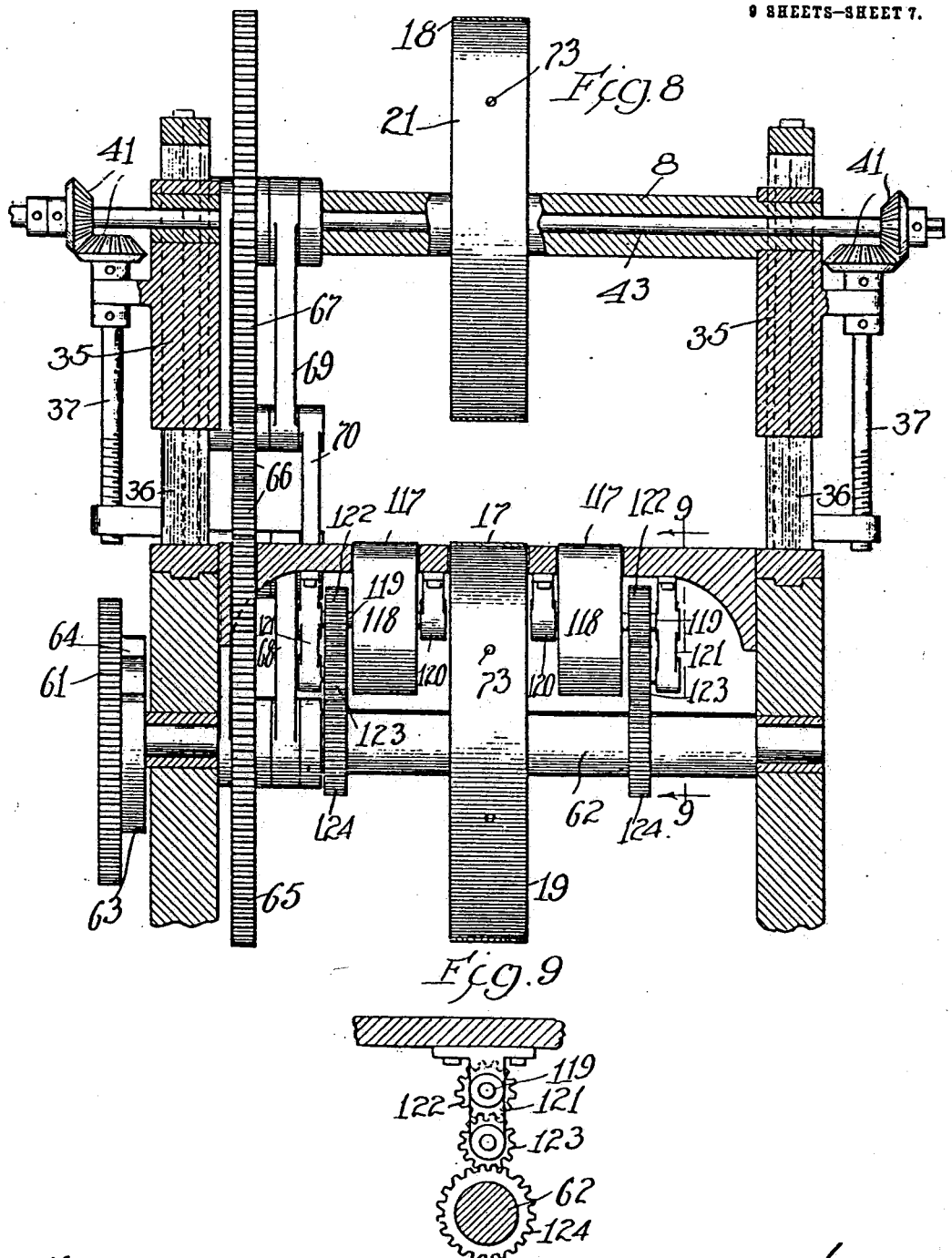

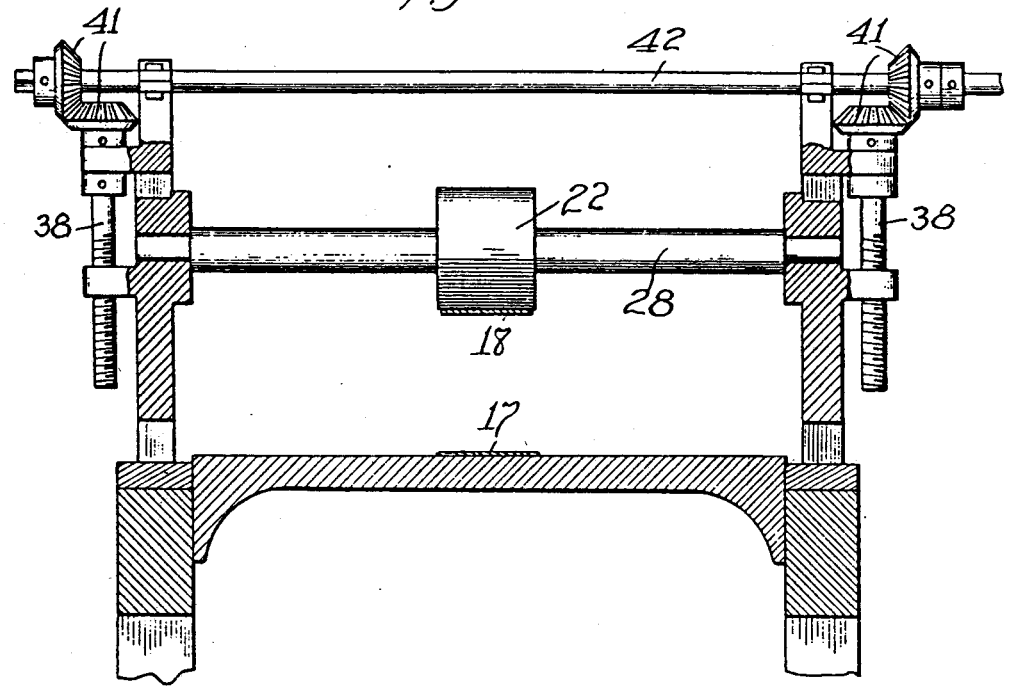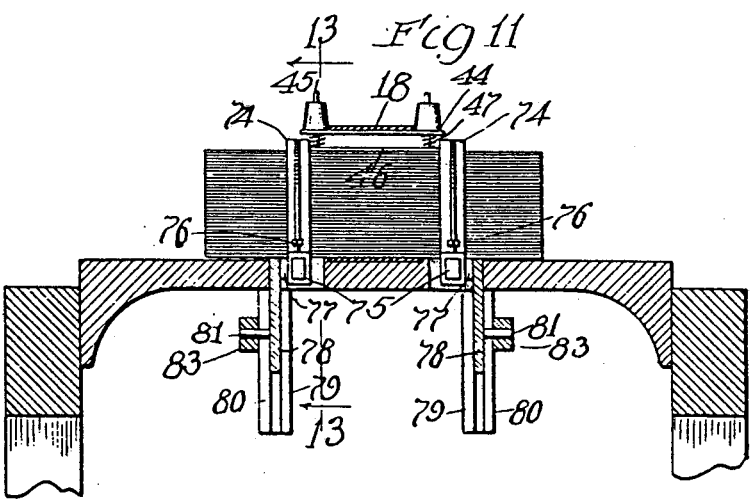

T. C. WELCH.
AUTOMATIC CONTINUOUS BOOK TRIMMING MACHINE.
APPLICATION FILED FEB. 14, 1910.
1,076,726.
Patented Oct. 28, 1913.
9 SHEETS—SHEET 9.
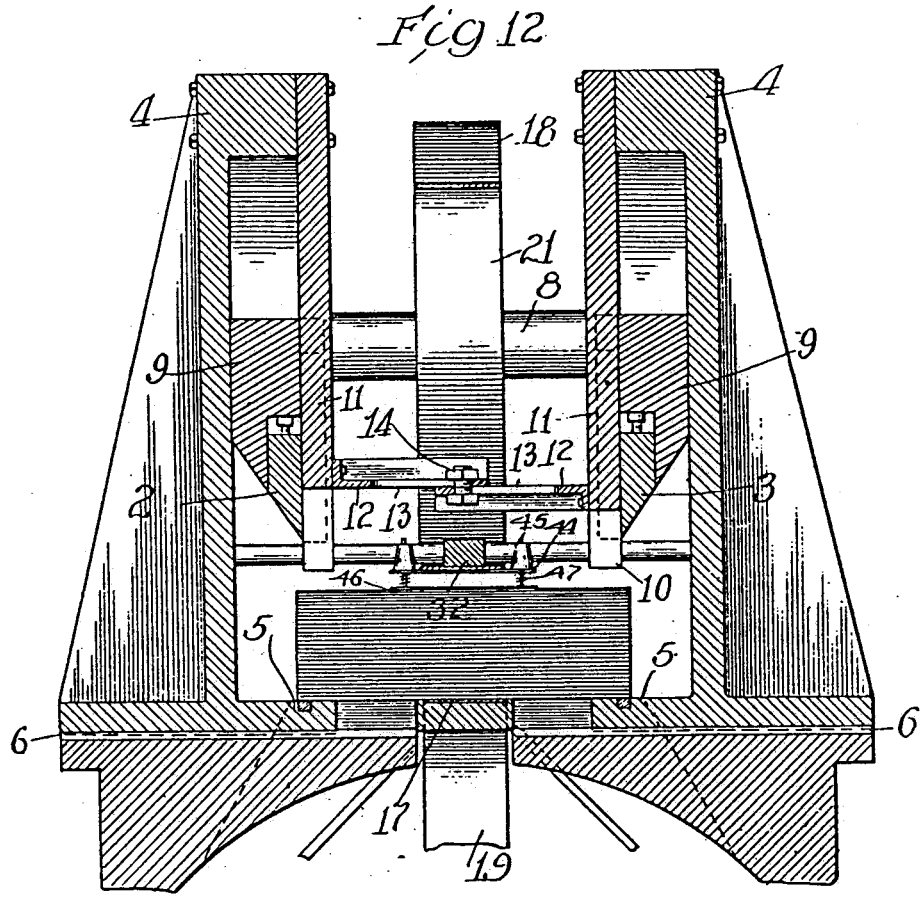
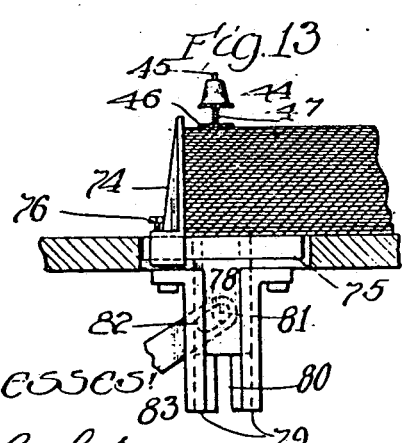
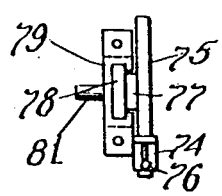

UNITED STATES PATENT OFFICE.

THOMAS C. WELCH, OF CHICAGO, ILLINOIS, ASSIGNOR, BY DIRECT AND MESNE ASSIGNMENTS, TO WELCH AUTOMATIC TRIMMER CO., A CORPORATION.

AUTOMATIC CONTINUOUS BOOK-TRIMMING MACHINE.

1,076,726.      Specification of Letters Patent.      Patented Oct. 28, 1913.

Application filed February 14, 1910. Serial No. 543,843.

*To all whom it may concern:*

Be it known that I, THOMAS C. WELCH, a citizen of the United States, residing at Chicago, in the county of Cook and State of Illinois, have invented certain new and useful Improvements in Automatic Continuous Book-Trimming Machines; and I do hereby declare the following to be a full, clear, and exact description of the invention, such as will enable others skilled in the art to which it appertains to make and use the same.

This invention relates to a novel construction in a book trimming machine, the object being to provide a machine of this character which is simple in construction and operates with great rapidity and accuracy and consists in the features of construction and combinations of parts hereinafter fully described and claimed.

In the accompanying drawings illustrating the invention: Figure —1— is a top plan view of a book trimming machine constructed in accordance with the invention. Fig. —2— is a side elevation of the same. Fig. —3— is a front elevation of the same. Fig. —4— is a rear elevation of the same. Fig. —5— is a fragmentary detail transverse section on the line 5—5 of Fig. —7—. Figs. —6— and —7— are vertical longitudinal sections on the lines 6—6 and 7—7 respectively of Fig. —1—. Fig. —8— is a fragmentary vertical transverse section on the line 8—8 of Fig. —2—. Fig. —9— is a fragmentary detail section on the line 9—9 of Fig. —3—. Fig. —10— is a detail vertical transverse section on the line 10—10 of Fig. —2—. Fig. —11— is a fragmentary vertical transverse section on the line 11—11 of Fig. —1—. Fig. —12— is a fragmentary detail vertical transverse section on the line 12—12 of Fig. —2—. Fig. —13— is a fragmentary detail vertical longitudinal section on the line 13—13 of Fig. —1—. Fig. —14— is a detail bottom plan view of the guide shown at the lower end of Fig. —13—.

The present machine constitutes another embodiment of the broad conception of the invention forming the subject of Letters Patent No. 1003679, granted to me Sept. 19, 1911, and the invention in the present machine resides in certain details of the construction as will be hereinafter fully described and claimed. The machine illustrated and described in the aforesaid application is adapted more particularly to trim book pads of somewhat limited thickness and up to a given minimum depth and length, its range of adjustment to handle book pads of varying dimensions being relatively limited. This is, of course, an objection as it necessitates large establishments being equipped with machines of different sizes to handle book pads having a wide range of variation in dimensions.

The present invention has for its object to provide means whereby book pads of widely different dimensions may be handled in a single machine, the mode of operation and the advantages accruing therefrom being retained. In other words the present invention relates solely to the embodiment in the machine of the aforesaid application of adjustable book engaging and trimming means thus adapting the machine to handle the smallest as well as the largest size books (extraordinary extremes excepted) usually produced.

A primary object of the invention is to provide means whereby the book pad may be engaged and firmly held at a point in very close proximity to the knife for trimming the front edge of the pad so that books having very short leaves (from back to free edge) may be trimmed in the machine, the difficulty in the aforesaid machine having been that the points of engagement could not be brought sufficiently near the front trimming knife to handle books of small depth.

A second object of the invention is to provide means whereby book pads of greatly varying thickness may be trimmed without regard to length or depth thereof.

A further object of the invention is to provide adjustable end trimming knives which may be moved toward or from each other and the interposed book carrying means to adapt them to trim books of greatly varying length, and to arrange the direction of travel of the knives from the back toward the front trimmed edges of the book pads so as to prevent tearing or burring the covers of the books.

The invention also has as further objects the provision of feeding devices for primarily positioning the book pads with relation to the front trimming knife; to provide means for readily and quickly effecting adjustment of all requisite parts to suit book pads of different sizes; to provide book delivery mechanism and generally to provide simple and durable means for accomplishing all of the aforesaid objects.

The machine comprises a suitable frame in and upon which the operating mechanism is suitably supported. The said operating mechanism comprises a trimming knife 1 for trimming the front edge of a book or book pad, and two trimming knives 2 and 3 respectively, for trimming the ends of the book or book pad, the trimming planes of said knives 2 and 3 extending at right angles to the trimming plane of the knife 1. The cutting beds of said knives 1, 2 and 3 are rigid relatively thereto, but the frames 4 in which the knives 2 and 3 and their cutting beds 5 are carried are adjustable toward and from each other to vary the length of the books trimmed thereby. The said frames 4 are provided in their bases with grooves in which the keys 6 lying in grooves on the upper faces of the side pieces of the frame are received, the said frames and said side pieces being held against relative movement after effecting adjustment by means of bolts 7. The knife is mounted in the usual manner on the bar 9 and the latter is guided in the usual manner to move at an incline to its cutting bed, the said guiding means being partly disposed on the presser or clamping bar 10 which is vertically movable in the trimming frame.

Each of the bars 9 is movable between the vertical standards of the frame 4 and bars 11, the said bars 11 being secured at their upper ends to the frames 4 and free at their lower ends. The knives in passing downwardly to trim the book pads exert a pressure against the said bars 11 by reason of the engagement of the beveled faces of said knives with the pad and to prevent said bars from yielding to such pressure, each of the same is provided at its free end with a bracket 12 provided with a longitudinal slot 13, the said brackets 12 of opposed bars overlapping each other and being secured against relative movement by means of the bolt 14 in an obvious manner. Each of the bars 9 is equipped at its ends with projections 15 each terminating in a substantially spherical end. This is connected by means of a pitman 16 with the crank of its operating wheel, said crank being similarly equipped with a spherical end thus forming universal joint connections between each pitman and the parts connected thereby which permits of adjustment of the frames and a movement of the pitman in an irregular plane during the trimming operation. The front trimming knife 1 is rigid with the frame of the machine.

The said trimming frames 4 are disposed upon either side of a table or supporting bar over which one member 17 of the carrier for the book pads moves. The said carrier consists of two belts 17 and 18 respectively, the belt 17 being trained over the driven pulley 19 and the idler 20 while the belt 18 is trained over a similar driven pulley 21 and two idlers 22 and 23 respectively, said idlers 20, 22 and 23 being disposed adjacent the front trimming knife 1. Said idler 23 is mounted on a shaft 24 journaled in free ends of arms 26 on a shaft 25 which is journaled in the free end of flanges 27 carried by the bearings in which said shaft 28 is journaled, the said bearings being vertically movable in the guides 29. Carried by similar diametrically opposite flanges 27 is a shaft 30 connected by means of links 31 with one end of a depressing bar 32 adapted to bear upon the belt 18 to hold the latter firmly in its plane of travel while engaging the book pads. At its other end said bar 32 is vertically movable in suitable guides 33 and is held against upward movement by means of set screws 34. The shaft 8 carrying the pulley 21 is journaled in bearings 35 which are vertically movable in guides 36. The vertical screw shafts 37 and 38 engage said bearings 35 and the bearings of the shaft 28 respectively, at one end and pass through suitable threaded projections of the frame at their other ends to effect vertical movement or adjustment of said bearings. Said screw shafts are turned by means of cranks 39 and 40 respectively, through the medium of the miter gears 41 in an obvious manner.

The crank 40 is mounted upon a shaft 42 which extends laterally across the machine and serves to simultaneously turn the said screw shafts 38 on opposite sides of the machine. The crank 39 is similarly mounted upon a shaft 43 which passes through the hollow shaft 8 on which the said pulley 21 is mounted and at its other end carries the miter gear 41 which meshes with the similar gear carried by the screw shaft 37 on said side so that both said screw shafts 37 are actuated simultaneously to adjust the elevation of said pulley 21.

Figure 5:
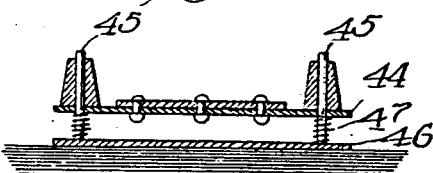

The said belt 18 carries cross plates 44 at intervals and in the projecting end portions of each of said plates 44 reciprocating plungers 45 are disposed, each pair of said plungers 45 carrying a presser plate 46, as shown in detail in Fig. 5, said presser plate being maintained normally at one limit of its movement by means of the compression springs 47. The said plungers and presser plates co-act with the belt 17 and the table 16 and bar 32 to firmly clamp the book pads between said belts 17 and 18.

The said idler 23 is raised and lowered at intervals between the insertion of book pads into the machine by means of the pitman 47' which is actuated by a cam as will be hereinafter described and with which the said shaft 30 is connected through the medium of a crank 48 thereon, the wrist pin of which is journaled in a bearing 49 vertically movable in a guide 50 in said pitman 47′ and which is engaged by the crank-operated screw shaft 51 to adjust the position of said bearing 49 in said guide.

Movement is imparted simultaneously to both the said belts 17 and 18 by means of a lever 52 (Fig. 2) pivotally secured at one end to the frame of the machine and which between its ends is provided with a longitudinal slot 53 in which a bearing 54 is slidable. In said bearing 54 is journaled the wrist pin 55 of a crank 56 rigidly mounted on a shaft 57 driven as hereinafter described and by means of which the said lever 52 is rocked. Pivotally secured at one end to the free end of said lever 52 is a rack bar 58 which at its other end is reciprocally movable in the guide 59 disposed upon the free end of an arm 60 pivotally mounted upon the shaft 62 carrying the pulley 19 and which is capable of swinging on said pivot to accommodate itself to the varying position of said guide 59 due to the movements of said rack bar 58. The latter meshes with a spur gear 61 loose on the shaft 62 carrying said pulley 19. Rigidly mounted on said shaft 62 adjacent said spur gear 61 is a ratchet wheel 63 having three teeth (in this instance) adapted to be engaged by the dog 64 pivotally mounted on said spur gear 61. Each movement of said rack bar 58 imparts movement in opposite directions to said spur gear 61. The movement of the latter in one direction is free and this movement is accomplished in a very much shorter time than the reverse movement owing to the fact that the crank 55 engages the lever 52 nearer the pivot thereof during that part of its revolution in which it throws the lever 52 upwardly than upon effecting the reverse stroke thereof during which said dog 64 engages the ratchet wheel 63 and turns the shaft 62 through an arc of 120 degrees. The movement of the said shaft 62 is imparted to the shaft 8 carrying the pulley 21 by means of a train of gearing comprising the spur gear 65 on the shaft 62, the idle spur pinions 66 meshing with each other and one of which meshes with spur gear 65 and the other with a spur gear 67 rigid with the pulley 21. The said spur pinions 66 are revoluble in the free ends of the arms 68 and 69, one of which is pivotally mounted upon each of said shafts 62 and 8 carrying said pulleys 19 and 21 respectively, and which at their free ends are pivotally connected together by means of the links 70, said pivotal connections being coincident with the axes of rotation of said idlers 66, the trunnions of the latter constituting the pivotal connections between said arms and said links.

The relative dispositions of the spur gear 61, ratchet 63 and spur gear 65 on the shaft 62 and relatively to the frame of the machine is more clearly shown in Fig. 8 on an enlarged scale, as is also the hollow shaft 8 and the shaft 43 passing therethrough to effect connection between the screw shafts 37 on opposite sides of the machine by means of which adjustment of the position of the pulley 21 is effected. It will be noted that vertical movement of the shaft 8 does not affect the gearing between the same and the shaft 62.

The said belts 17 and 18 and pulleys 19 and 21 are equipped with coacting means for preventing the belt from slipping thereon, this being obviously essential to maintain the clamping devices for the book pads in proper relative position to engage successive book pads inserted in the machine. Said means for preventing slippage comprise projections 72 on said belts 17 and 18 which are adapted to enter recesses 73 in the faces of said pulleys. In order to permit the belts to be shifted on said pulleys to adjust the position of the clamps carried by the belt 18 so as to engage book pads of varying depth, the faces of said pulleys 19 and 21 are provided with several sets of said recesses 73 spaced short distances apart so as to enable the projections 72 on said belts to be brought into engaging relation with either of said sets whereby said clamps are brought into engaging relation with the book pad a greater or less distance from the trimming knife 1 as occasion may require.

On either side of the plane of travel of the belt 17 and passing through the top plate of the frame of the machine, I provide what I will term disappearing stops 74 against which the rear edge of the book pad bears when the latter is primarily inserted into trimming relation to the front trimming knife 1. Each of said stops 74 is adjustably mounted on a horizontal bar 75 (Figs. 13 and 14) and is held against movement thereon by means of a set screw 76. The said bar 75 is disposed upon the free end of a projection 77 carried by a vertically reciprocating plunger 78 movable in the vertical guide 79 secured to the lower face of the top plate of the frame. The said guide 79 is provided with a slot 80 through which the pin 81 on the plunger 78 projects, the said pin entering the longitudinal slot 82 in the free end of a rocking arm 83 mounted upon a shaft 84 (Figs. 2 and 6) journaled in bearings in the side plates of the frame. The said shaft 84 is rocked by means of the crank 85 carried thereby and pivotally connected with a pitman 86 which is actuated by a cam as will be hereinafter fully described.

The books may be fed into the machine by hand but it is preferred to effect such feed into trimming relation with the front trimming knife 1 by mechanical means so as to obviate the danger to the operator resulting from inserting the fingers into the trimming plane. To this end I provide a reciprocating plate 87 movable in guides 88 in the arms 89 of the side plates of the frame which said plate 87 carries an angle plate 90 slidable thereon. The said plate 90 carries a projection 91 which passes downwardly through a longitudinal slot 92 in said plate 87 and is connected by means of a link 93 with the free end of a lever 94 pivotally secured at its other end on a shaft 95 mounted at its ends in projections 96 of said side faces of the frame. Said shaft 95 is rocked by means of the crank 97 carried thereby, the wrist pin of which is connected by means of a link with the wrist pin of the crank on the wheel 98. The said plate 87 is reciprocated relatively to the arms 89 by means of the lever 99 pivotally mounted between its ends upon a projection 100 of one of the side plates of the machine and one end of which carries an anti-friction roller which is engaged in the cam groove 101 of the wheel 102, the other end of said lever being connected by means of a link 103 with a projection 104 on said plate 87. The said plate 87 is adapted to move rearwardly as the trimming knife 1 operates so as to leave an opening between the inner ends of said plate and the cutting bed of said knife through which the paper trimmed from the front edges of the books may drop, it being obviously essential to keep said feed table clear of the paper.

The machine is driven by means of the drive shaft 105 carrying the pulley 106 and spur pinions 107. The latter mesh with the spur gears 108 at either side of the machine each of which carries a crank pin 109 connecting with the pitman 16 engaging one end of the knife bars of the side trimmers. The said spur gears 108 meshes with the idle spur gears 110 and the latter in turn mesh with the spur gears 111 on the shaft 57 actuating the other pitman 16 for operating the side trimming knives. The said spur gears 108 also mesh with spur gears 112. In the instance illustrated the latter are shown as being provided respectively with cam grooves 113 and 114. In the cam groove 113 the anti-friction roller disposed upon the lower end of the pitman or plunger 47' is engaged, said plunger being actuated thereby to raise and maintain the same raised during a given part of the revolutions of said wheel. In the cam groove 114 the anti-friction wheel at the lower end of the plunger 86 is engaged, the same being raised and lowered at predetermined intervals thereby to actuate the disappearing stops 74. The said spur gears 112 mesh with the spur gears 115 mounted on the shafts actuating the front trimming knife 1. Said spur gears 115 mesh with spur gears 98 and 102 respectively, the former of which is equipped in one face with the cam groove 101 actuating the lever 99 and the other of which is equipped with the crank pin 116 actuating the rock shaft 95 by means of which the plate 90 is reciprocated through the medium of the arm or lever 94. The cam grooves are shown as being formed directly in the several spur gears mentioned for purposes of convenience, it being understood, of course, that the separate cam wheels may be employed if desired.

The operation of the machine is as follows: At the time of insertion of the book pads, plate 90 and table 87 are disposed respectively, at the rearward limits of their movement. The book pad is inserted in front of the up-turned flange of the plate 90 and thereupon the latter together with the table 87 moves forward, the said plate 90 traveling somewhat faster than said table. The table reaches the forward limit of its movement ahead of the plate 90 so as to close the opening in front of the cutting bed of the front trimming knife 1. At the same time that the book pad is moved forward the disappearing stops 74 are raised and the book pad pressed against the same by said plate 90. While the disappearing stops are rising and the book pads being fed forward, the pitman or plunger 47' is maintained at the upward limit of its movement thereby raising idler 23 and that part of the belt 18 lying between said idler 23 and the idler 22. As the book pad is brought into contact with said disappearing stops 74 the said pitman or plunger 47' drops thus lowering the idler 23 to the position shown in Fig. 7 and throwing the presser plate 46 into engagement with the top of the book pad thus compressing the latter between said plate and the belt 17. The plate 90 now recedes as does also the table 87 and the stops 74 drop out of the path of the book pad. The front trimming knife now moves downwardly and trims the front edge of the pad and upon completion of this movement, belts 17 and 18 are actuated to move the pad forward to the second position indicated in Figs. 2 and 7. Another pad is now inserted and the first-named operation is repeated thereby advancing the first pad to the third position under the side trimming knives 2 and 3 where the ends of the pad are trimmed off. The said trimming knives 1, 2 and 3 are actuated at slightly different intervals so that for example the front trimming knife 1 begins its downward movement and this is followed successively at relatively very short intervals by the knives 2 and 3 so that each of said knives finishes the trimming operation at a different time although to all practical intents and purposes substantially simultaneously. The book pad now advances to the fourth position shown in Figs. 2 and 7 having been trimmed on its three edges and is now ready to be delivered from the machine. To effect delivery, I provide a pair of belts 117 trained over driven pulleys 118 (Fig. 8) disposed on either side of the pulley 19 and mounted on shafts 119 journaled in bearings in hangers 120 and 121. On each of the shafts 119 is a spur pinion 122 which meshes with the idle spur pinion 123 and this in turn with the spur gear 124 on the shaft 62. The said belts 117 are trained at their other ends over idle pulleys 125 carried by a shaft 126 journaled in bearings in the free ends of arms 127 projecting from the side face of the frame of the machine.

Figure 2:
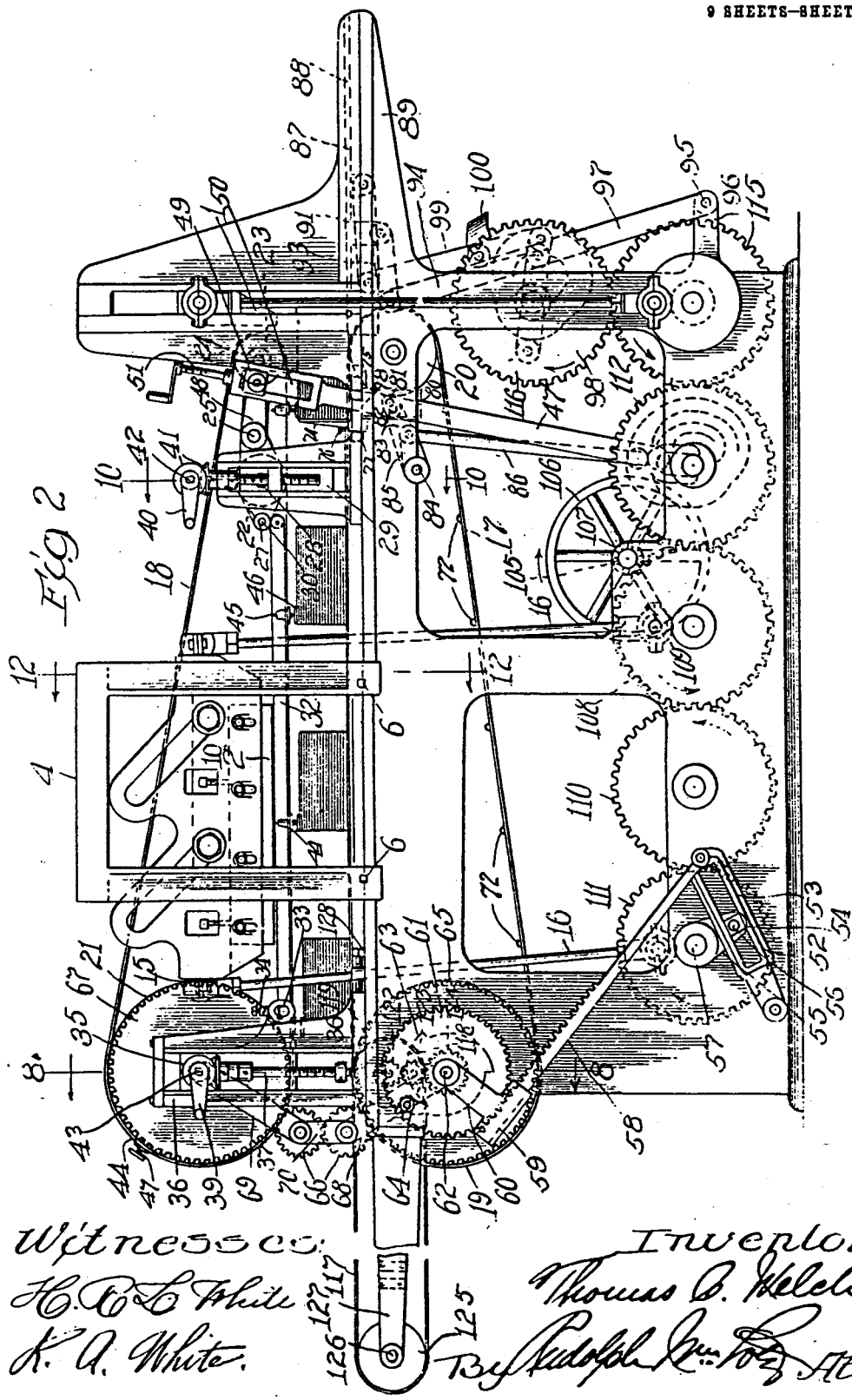
Figure 3:
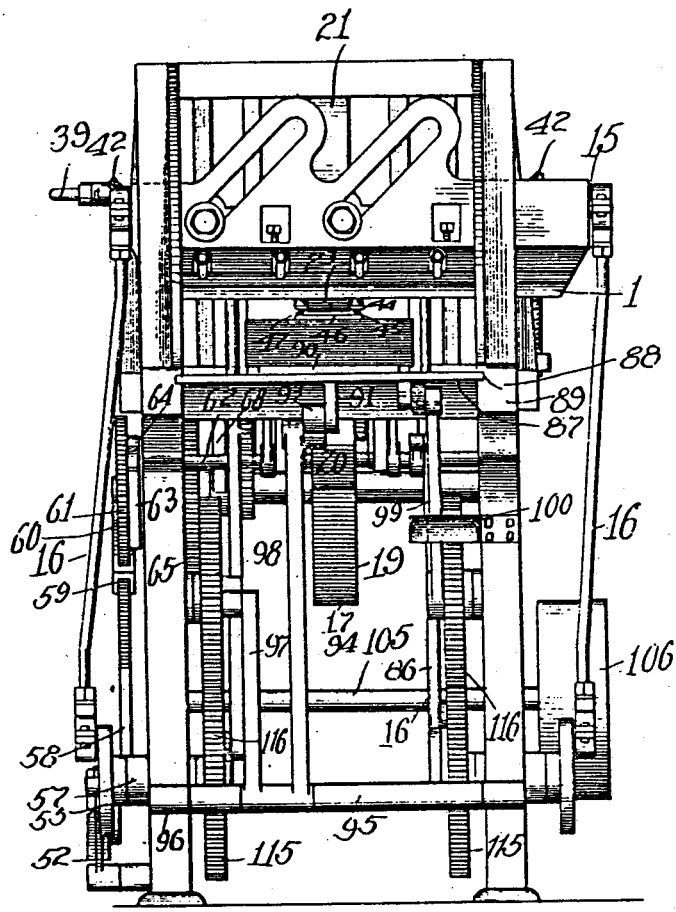
Figure 4:
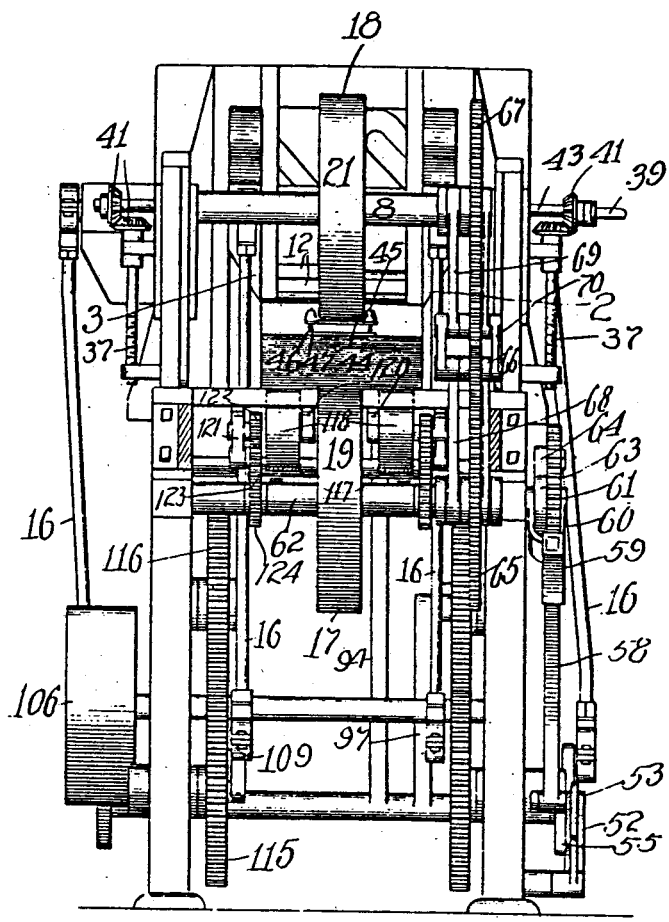

It will be noted that the spur gear 124 is of greater diameter than the spur gear 122 so that said belts 117 are actuated at intervals corresponding with the intervals of actuation of the belts 17 and 18 but at a greater speed than the latter so that the pads after leaving the last position shown in Figs. 2 and 7 are carried by the belts 17 and 18 upon said belts 117 and are immediately moved by the latter at greater speed in position to be removed by an operator standing at the delivery end of the machine.

By means of the bars 16 and 32 the belts 17 and 18 are maintained positively in their respective planes of travel and the book pads thus firmly engaged between the same so as to prevent distortion of the same while passing through the machine. The upper face of the belt 17 passing from the idler 20 to the pulley 19 is disposed in a plane coincident with that of the cutting beds of the knives 1, 2 and 3 so that book pads rest upon said cutting beds prior to their engagement by the presser bars of the trimming knives. This is a particularly requisite essential feature of the machine as the trimming operation cannot be successfully performed without danger of distortion of the book pads unless the latter are caused to travel only in a given plane.

Any suitable means for maintaining the belts 17 and 18 taut may be provided. In the instance illustrated I have shown set screws 128 suitably disposed upon the frame of the machine and bearing against the standards in which the bearings 35 of the shaft 8 are mounted as an example of such belt tightening means.

The belts employed are preferably of steel although any other material suited to the purpose may obviously be employed without departing from the invention.

I claim as my invention:

1. In a book trimming machine, the combination with trimming means disposed at a plurality of points on the frame of the machine, the cutting beds of said trimming means disposed in the same horizontal plane, of two opposed carriers between which the book pad is adapted to be engaged and carried from one of said trimming means to the remainder thereof, the book engaging face of one of said carriers traveling in the plane of the cutting beds, and means actuating said carriers between the intervals of operation of the trimming means.

2. In a book trimming machine, a knife for trimming the front edge of a book moving in guides rigid with the frame of the machine, a cutting bed for said knife rigid with the frame of the machine, knives for trimming the ends of the book, frames in which said knives move movably mounted on the frame of the machine and adapted to be adjusted thereon, cutting beds for said knives rigid with said frames, all of said cutting beds lying in the same horizontal plane, and book carrying means movable relatively to said respective trimming knives and traveling in the plane of the cutting beds.

3. In a book trimming machine, trimming knives, frames in which said knives are movable, at least one of said frames being adjustable on the frame of the machine, a cutting bed disposed in the trimming plane of each knife, all of said cutting beds lying in a common horizontal plane and each of said knives adapted to trim a different portion of a book pad, and book presenting means movable relatively to said cutting beds and in the plane thereof.

4. In a book trimming machine, a trimming knife for trimming the front edge of a book, a frame rigid with the frame of the machine in which said knife is movable, knives for trimming the ends of a book, frames in which said knives are movable, at least one of said frames being adjustable on the frame of the machine, a cutting bed for each of said knives maintained always in the trimming plane thereof, all of said cutting beds lying in the same horizontal plane, and book presenting means movable relatively to said respective cutting beds in the said horizontal plane thereof.

5. In a book trimming machine, a trimming knife mounted in a frame adjustably mounted on the frame of the machine, rotating cranks, pitmen operably connecting said cranks with said trimming knife, and universal joint connections between said pitmen and said parts connected thereby.

6. In a book trimming machine, a trimming knife for trimming the front edge of a book, a frame rigid with the frame of the machine in which said knife is movable, parallel knives for trimming the ends of a book, frames in which said knives are movable, at least one of said frames being adjustable on the frame of the machine, toward and from the other of said knives, a cutting bed for each of said knives maintained always in the trimming plane thereof, all of said cutting beds lying in the same horizontal plane, and book presenting means movable relatively to said respective cutting beds in the horizontal plane thereof.

7. In a book trimming machine, the combination with parallel trimming means adjustably disposed on the frame of the machine and each equipped with a cutting bed rigid therewith, said cutting beds disposed in the same horizontal plane, of book carrying means traveling between said trimming means and in the horizontal plane of said cutting beds, said book carrying means being of less width than the space between the trimming planes, the ends of the books carried thereby adapted to project into said planes.

8. In a book trimming machine, the combination with parallel trimming means adjustably disposed on the frame of the machine and each equipped with a cutting bed rigid therewith, of book carrying means traveling between said trimming means, the book supporting surface of said carrying means disposed in the plane of said cutting beds and being of less width than the space between the trimming planes, the supported books adapted to project at their ends into said trimming planes.

9. In a book trimming machine, the combination with the trimming means, of book conveying means comprising a supporting carrier, and a coacting member independent of and movable relatively to said conveying means engaging the books and maintaining the same in place on said carrier.

10. In a book trimming machine, the combination with the trimming means, of book conveying means comprising a supporting carrier, and a traveling coacting member independent of and movable relatively to said conveying means engaging the books and maintaining the same in place on said carrier, and gearing between said carrier and said coacting member for causing the same to move in unison.

11. In a book trimming machine, the combination with the trimming means, of book conveying means comprising a supporting carrier, and a traveling coacting member equipped with spring actuated clamping means engaging the books and maintaining the same in place on said carrier.

12. In a book trimming machine, the combination with the trimming means, of book conveying means comprising a supporting carrier, and a traveling coacting member equipped with spring actuated clamping means engaging the books and maintaining the same in place on said carrier, and gearing between said carrier and said coacting member for causing the same to move in unison.

13. In a book trimming machine, the combination with trimming means, of a supporting carrier for books, a traveling book engaging member geared thereto and adapted to maintain the books in place on said carrier, and means for imparting relative separating movement to said carrier and said member at one end to permit insertion of books therebetween.

14. In a book trimming machine, the combination with trimming means, of a supporting carrier for books, a traveling book engaging member geared thereto and equipped with spring actuated clamping means adapted to engage the books to maintain the same in place on said carrier, and means for imparting relative separating movement to said carrier and said member at one end to permit insertion of books therebetween.

15. In a book trimming machine, the combination with a plurality of trimming knives for trimming different edges of a book, of a traveling belt supporting the books and adapted to carry the same from trimming relation to one of said knives into trimming relation to the remainder thereof, a second belt moving in a plane parallel with the first-named and engaging the books to maintain the same in position on the latter and means for simultaneously actuating said belts.

16. In a book trimming machine, the combination with a plurality of trimming knives for trimming different edges of a book, of a traveling belt supporting the books and adapted to carry the same from trimming relation to one of said knives into trimming relation to the remainder thereof, a second belt moving in a plane parallel with the first-named and equipped with pressers adapted to bear on the books to hold same against movement relatively to the first-named belt, and means for simultaneously actuating said belts.

17. In a book trimming machine, the combination with a plurality of trimming knives for trimming different edges of a book, and a carrier belt for transporting the books from trimming relation to one of said knives into trimming relation to the others thereof, a second belt traveling in a plane parallel with the first-named, the books being engaged between said belts and held against movement relatively thereto, and means for imparting relative separating movement to said belts at one end to permit insertion of books therebetween.

18. In a book trimming machine, the combination with a plurality of trimming knives for trimming different edges of a book, and a carrier belt for transporting the books from trimming relation to one of said knives into trimming relation to the others thereof, a second belt traveling in a plane parallel with the first-named, spring actuated pressers carried by said second belt and engaging interposed books to hold the same against movement relatively to said belts, and means for imparting relative separating movement to said belts at one end to permit insertion of books therebetween.

19. In a book trimming machine, the combination with a plurality of trimming knives for trimming different edges of a book, and a carrier belt for transporting the books for trimming different edges of a book, and into trimming relation to the others thereof, a second belt traveling in a plane parallel with the first-named, the books being engaged between said belts and held against movement relatively thereto, an idler over which said last-named belt is trained at one end, and means for raising said idler at intervals to separate said belts at one end to permit insertion of books therebetween.

20. In a book trimming machine, the combination with a plurality of trimming knives for trimming different edges of a book, and a carrier belt for transporting the books from trimming relation to one of said knives into trimming relation to the others thereof, a second belt traveling in a plane parallel with the first-named, the books being engaged between said belts and held against movement relatively thereto, two idlers over which said last-named belt is trained at and between the limits of travel thereof respectively, and means for raising the endmost idler at intervals to separate said belts and permit insertion of books therebetween.

21. In a book trimming machine, the combination with a plurality of trimming means for trimming various edges of a book, of a traveling book-carrying belt for conveying books into trimming relation to at least one of said trimming means, a second belt movable in a plane parallel with the plane of travel of the carrying belt, pulleys over which said last-named belt is trained, and means operatively engaging said pulleys for raising and lowering said belt.

22. In a book trimming machine, the combination with a plurality of trimming means for trimming various edges of a book, of a traveling book-carrying belt for conveying books into trimming relation to at least one of said trimming means, a second belt movable in a plane parallel with the plane of travel of the carrying belt, book engaging devices carried by said second belt and serving to hold the books against movement relatively to said belts, pulleys over which said last-named belt is trained, and means operatively engaging said pulleys for raising and lowering said belt.

23. In a book trimming machine, the combination with a plurality of trimming means for trimming various edges of a book, of a traveling book-carrying belt for conveying books into trimming relation to at least one of said trimming means, a second belt movable in a plane parallel with the plane of travel of the carrying belt, pulleys over which said respective belts are trained, one of said pulleys of one belt being driven and a pulley of the other belt geared thereto and means operatively engaging the pulleys of said second belt for raising and lowering the latter.

24. In a book trimming machine, the combination with a plurality of trimming means for trimming various edges of a book, of a traveling book-carrying belt for conveying books into trimming relation to at least one of said trimming means, a second belt movable in a plane parallel with the plane of travel of the carrying belt, pulleys over which said respective belts are trained, one of said pulleys of one belt being driven, means operatively engaging the pulleys of one of said belts for imparting relative movement to said belts toward and from each other, gearing between the said driven pulley and a pulley of the other belt, and means controlling said gearing automatically adjusting the position of the same to accord with the relative positions of the pulleys and maintain the same geared to each other.

25. In a book trimming machine, the combination with a plurality of trimming means for trimming various edges of a book, of a traveling book-carrying belt for conveying books into trimming relation to at least one of said trimming means, a second belt movable in a plane parallel with the plane of travel of the carrying belt, pulleys over which said last-named belt is trained, and means operatively engaging said pulleys for raising and lowering said belt, and cam actuated means operatively engaging one of said pulleys of said second belt for raising the same at intervals.

26. In a book trimming machine, the combination with a trimming knife for trimming one edge of a book, and a book carrier for conveying books therefrom, of means for positioning books relatively to said trimming knife, said means comprising stops disposed rearwardly of the trimming plane, a reciprocating carrier for books movable toward and from said stops on the other side of the trimming plane and feeding the books into engagement with said stops, and means operatively engaging said books with said first-named carrier.

27. In a book trimming machine, the combination with a trimming knife for trimming one edge of a book, and a book carrier for conveying books therefrom, of means for positioning books relatively to said trimming knife, said means comprising movable stops disposed rearwardly of the trimming plane in the path of the books, a reciprocating carrier for books movable toward and from said stops on the other side of the trimming plane and feeding the books into engagement with said stops, means operatively engaging said books with said first-named carrier, and mechanism operatively actuating said stops to move the same alternately into and out of the path of the books at intervals.

28. In a book trimming machine, the combination with a trimming knife for trimming one edge of a book, and a book carrier for conveying books therefrom, of means for positioning books relatively to said trimming knife, said means comprising movable stops disposed rearwardly of the trimming plane in the path of the books, a reciprocating table disposed on the other side of the trimming plane, a reciprocating carrier for books movable upon and relatively to said table and feeding books into engagement with said stops, and means operatively engaging said books with said first-named carrier, said table moving to the farther limit of its movement relatively to the trimming plane during the trimming stroke of said knife whereby an opening is provided through which the shavings are discharged.

29. In a book trimming machine, the combination with a knife for trimming one edge of a book, of a reciprocating table movable relatively to the trimming plane, and means actuating said table to throw the same to the far limit of its movement relatively to the trimming plane during the trimming operation to provide an open space for the passage of shavings.

In testimony whereof I have signed my name in presence of two subscribing witnesses.

THOMAS C. WELCH.

Witnesses:
RUDOLPH WM. LOTZ,
M. M. BOYLE.

DISCLAIMER.

1,076,726.—*Thomas C. Welch*, Chicago, Ill. AUTOMATIC CONTINUOUS BOOK-TRIMMING MACHINE. Patent dated October 28, 1913. Disclaimer filed November 15, 1919, by original assignee, *James Rowe*, assignee by mesne assignments—*American Assembling Machine Company* (assignment in escrow)—joining.

Enters this disclaimer—

"To the following claims of the specification, which are in the following words, to wit:

"3. In a book trimming machine, trimming knives, frames in which said knives are movable, at least one of said frames being adjustable on the frame of the machine, a cutting bed disposed in the trimming plane of each knife, all of said cutting beds lying in a common horizontal plane and each of said knives adapted to trim a different portion of a book pad, and book presenting means movable relatively to said cutting beds and in the plane thereof.

"4. In a book trimming machine, a trimming knife for trimming the front edge of a book, a frame rigid with the frame of the machine in which said knife is movable, knives for trimming the ends of a book, frames in which said knives are movable, at least one of said frames being adjustable on the frame of the machine, a cutting bed for each of said knives maintained always in the trimming plane thereof, all of said cutting beds lying in the same horizontal plane, and book presenting means movable relatively to said respective cutting beds in the said horizontal plane thereof.

"6. In a book trimming machine, a trimming knife for trimming the front edge of a book, a frame rigid with the frame of the machine in which said knife is movable, parallel knives for trimming the ends of a book, frames in which said knives are movable, at least one of said frames being adjustable on the frame of the machine, toward and from the other of said knives, a cutting bed for each of said knives maintained always in the trimming plane thereof, all of said cutting beds lying in the same horizontal plane, and book presenting means movable relatively to said respective cutting beds in the horizontal plane thereof.

"7. In a book trimming machine, the combination with parallel trimming means adjustably disposed on the frame of the machine and each equipped with a cutting bed rigid therewith, said cutting beds disposed in the same horizontal plane, of book carrying means traveling between said trimming means and in the horizontal plane of said cutting beds, said book carrying means being of less width than the space between the trimming planes, the ends of the books carried thereby adapted to project into said planes.

"8. In a book trimming machine, the combination with parallel trimming means adjustably disposed on the frame of the machine and each equipped with a cutting bed rigid therewith, of book carrying means traveling between said trimming means, the book supporting surface of said carrying means disposed in the plane of said cutting beds and being of less width than the space between the trimming planes, the supported books adapted to project at their ends into said trimming planes.

"26. In a book trimming machine, the combination with a trimming knife for trimming one edge of a book, and a book carrier for conveying books therefrom, of means for positioning books relatively to said trimming knife, said means comprising stops disposed rearwardly of the trimming plane, a reciprocating carrier for books movable toward and from said stops on the other side of the trimming plane and feeding the books into engagement with said stops, and means operatively engaging said books with said first-named carrier.

"27. In a book trimming machine, the combination with a trimming knife for trimming one edge of a book, and a book carrier for conveying books therefrom, of means for positioning books relatively to said trimming knife, said means comprising movable stops disposed rearwardly of the trimming plane in the path of the books, a reciprocating carrier for books movable toward and from said stops on the other side of the trimming plane and feeding the books into engagement with said stops, means operatively engaging said books with said first-named carrier, and mechanism operatively actuating said stops to move the same alternately into and out of the path of the books at intervals."

[*Official Gazette December 2, 1919.*]